US012145065B2

(12) United States Patent
Rudi et al.

(10) Patent No.: US 12,145,065 B2
(45) Date of Patent: Nov. 19, 2024

(54) COOPERATIVE AND COACHED GAMEPLAY

(71) Applicants: SONY INTERACTIVE ENTERTAINMENT LLC, San Mateo, CA (US); SONY INTERACTIVE ENTERTAINMENT INC., Tokyo (JP)

(72) Inventors: Olga Rudi, San Mateo, CA (US); Kristine Young, San Mateo, CA (US); Mahdi Azmandian, San Mateo, CA (US); Jin Zhang, San Mateo, CA (US); Sarah Karp, San Mateo, CA (US); Sepideh Karimi, San Mateo, CA (US); Elizabeth Juenger, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 20 days.

(21) Appl. No.: 17/828,861

(22) Filed: May 31, 2022

(65) Prior Publication Data

US 2023/0381652 A1    Nov. 30, 2023

(51) Int. Cl.
*A63F 13/5375*  (2014.01)
*A63F 13/44*    (2014.01)
*A63F 13/67*    (2014.01)

(52) U.S. Cl.
CPC .......... *A63F 13/5375* (2014.09); *A63F 13/44* (2014.09); *A63F 13/67* (2014.09);
(Continued)

(58) Field of Classification Search
CPC ...... A63F 13/5375; A63F 13/44; A63F 13/67; A63F 2300/305; A63F 2300/5553; A63F 2300/6027; A63F 2300/638
See application file for complete search history.

(56) References Cited

U.S. PATENT DOCUMENTS

2008/0158232 A1*  7/2008  Shuster ............... G06T 19/003
                                                 345/474
2019/0099676 A1*  4/2019  Bostick .................. A63F 13/35
(Continued)

FOREIGN PATENT DOCUMENTS

WO       2021066849 A1    4/2021
WO    WO 2023/235091     12/2023

OTHER PUBLICATIONS

PCT Application No. PCT/US23/20725, International Search Report mailed Jul. 21, 2023 (14 pages).

*Primary Examiner* — Thomas H Henry
(74) *Attorney, Agent, or Firm* — Polsinelli LLP

(57) ABSTRACT

Methods and systems for cooperative or coached gameplay in virtual environments are disclosed. Memory may store a content control profile regarding a set of control input associated with an action in a virtual environment of a digital content title. A request may be received from a set of one or more users associated with different source devices regarding cooperative gameplay of the digital content title. At least one virtual avatar may be generated for an interactive session of the digital content title in response to the request. A plurality of control inputs may be received from the plurality of different source devices and combined into a combination set of control inputs. Generating the combination set of control input may be based on the content control profile. Virtual actions associated with the virtual avatar may be controlled within the virtual environment in accordance with the combination set of control inputs.

22 Claims, 5 Drawing Sheets

(52) U.S. Cl.
CPC . *A63F 2300/305* (2013.01); *A63F 2300/5553* (2013.01); *A63F 2300/6027* (2013.01); *A63F 2300/638* (2013.01)

(56) References Cited

U.S. PATENT DOCUMENTS

2019/0329139 A1   10/2019  Di Giacomo Toledo et al.
2021/0001229 A1*   1/2021  Somers .................. A63F 13/56

* cited by examiner

COOPERATIVE AND COACHED GAMEPLAY

BACKGROUND OF THE INVENTION

1. Field of the Invention

The present system generally relates to cooperative or coached navigation of virtual environments. More specifically, the present system relates to joint or shared control of individual roles or points of views by multiple users within virtual environments.

2. Description of the Related Art

Many different types of individuals of varying experience may engage in the use of an entertainment system to experience virtual environments associated with digital content titles. Video game consoles, handheld devices, computers, and virtual reality systems—and the associated digital content accessed and played by the same—may continuously be updated or refreshed to new versions that provide new experiences, as well as challenges in learning and adaptation. For some individuals, learning to navigate new types of virtual environments and/or play new video games on new hardware may be a frustrating process due not only to lack of familiarity with specific game titles, but also to lack of familiarity in how to use the hardware to execute intended moves and other game interactions. In addition, some types of hardware or hardware inputs (e.g., combos) may be difficult for players who have physiological or mental conditions that limit movement, dexterity, memory, etc. Moreover, even highly experienced and expert players may experience some difficulty or awkwardness during transitions to new or unfamiliar systems, devices, and game titles. Muscle memory and force of habit in relation to old or familiar systems and titles may not necessarily translate, and such users may end up making a variety of input errors that lead to unintended in-game moves and interactions.

Many entertainment systems and new media content typically provide only cursory introductions to a user, such as a quick setup guide on a new console or introductory tutorials in a video game. Depending on the user's experience level, abilities, and the extent of the materials, such materials—and the experience of learning to navigate a new or unfamiliar virtual environment—may nevertheless be daunting in terms of volume and complexity to a user that infrequently interacts with such a device or content, thereby only serving to further confuse, frustrate, and/or overwhelm the user.

Therefore, there is a need in the art to provide improved systems and methods for cooperative and/or coached play within virtual environments.

SUMMARY OF THE CLAIMED INVENTION

Systems and methods for cooperative or coached gameplay in virtual environments may be provided. Memory may store a content control profile regarding a set of control input associated with an action in a virtual environment of a digital content title. A request may be received from a set of one or more users associated with different source devices regarding cooperative gameplay of the digital content title. At least one virtual avatar may be generated for an interactive session of the digital content title in response to the request. A plurality of control inputs may be received from the plurality of different source devices and combined into a combination set of control inputs. Generating the combination set of control input may be based on the content control profile. Virtual actions associated with the virtual avatar may be controlled within the virtual environment in accordance with the combination set of control inputs.

DETAILED DESCRIPTION

Embodiments of the present invention include methods and systems for cooperative or coached gameplay in virtual environments. Memory may store a content control profile regarding a set of control input associated with an action in a virtual environment of a digital content title. A request may be received from a set of one or more users associated with different source devices regarding cooperative gameplay of the digital content title. At least one virtual avatar may be generated for an interactive session of the digital content title in response to the request. A plurality of control inputs may be received from the plurality of different source devices and combined into a combination set of control inputs. Generating the combination set of control input may be based on the content control profile. Virtual actions associated with the virtual avatar may be controlled within the virtual environment in accordance with the combination set of control inputs.

Figure 1:
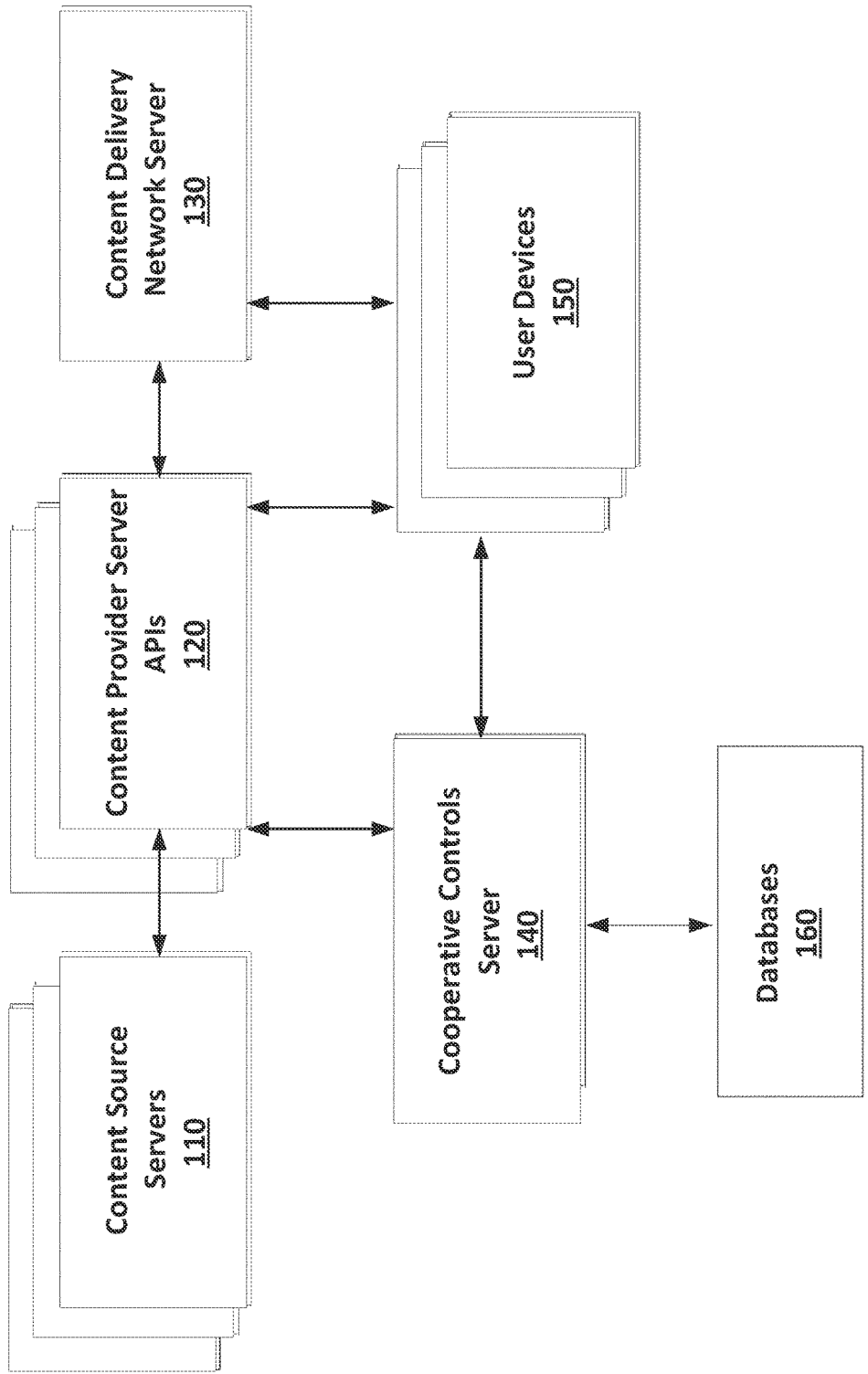
FIG. 1 illustrates an exemplary network environment in which a system for cooperative or coached gameplay in virtual environments may be implemented.

FIG. 1 illustrates an exemplary network environment in which a system for cooperative or coached gameplay in virtual environments may be implemented. The network environment 100 may include one or more content source servers 110 that provide digital content (e.g., games, other applications and services) for distribution, one or more content provider server application program interfaces (APIs) 120, content delivery network server 130, cooperative controls server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different content titles and/or associated interactive sessions, which may further be associated with object data regarding a digital or virtual object (e.g., activity information, zone information, character information, player information, other game media information, etc.) displayed in a digital or virtual environment during an interactive session. The same content source server 110 or different content source servers 110 may host one or both the content title itself and one or more associated interactive sessions during which a user may navigate, interact with, initiate and control virtual actions (including actions performed by one or more virtual avatars) and/or play within a virtual environment resulting from execution of the digital content title.

Such content may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent with one or more communication sessions, and the gameplay and communication sessions may be hosted on one or more of the content source servers 110. Such chat or other communication services may be used among the user devices 150 (including source devices) to verbally coordinate gameplay or communicate coaching tips, hints, contextual data, coaching instructions, and the like.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, cooperative controls server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

As illustrated, cooperative controls server 140 may include any data server known in the art that is capable of communicating with the different content source servers 110, content provider server APIs 120, content delivery network server 130, user devices 150, and databases 160. Such cooperative controls server 140 may be implemented on one or more cloud servers that carry out instructions associated with interactive content (e.g., games, activities, video, podcasts, User Generated Content ("UGC"), publisher content, etc.). In some implementations, the functions of cooperative control server 140 may be provided as a service in accordance with instructions embodied in any combination of remote, cloud-based, or local applications that have been specially configured and arranged to provide the service to a specific user or set of users.

The user device 150 may include a plurality of different types of computing devices known in the art. The user device 150 may be a computing device that may include any number of different gaming consoles and associated controllers and peripherals, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with session participants (e.g., interactive players) or other types (e.g., spectators) of users in relation to one or more interactive sessions within a virtual environment associated with digital content.

While pictured separately, the databases 160 may be stored on any of the servers and devices illustrated in network environment 100 on the same server, on different servers, or on any of the user devices 150. Such databases 160 may store or link to various sources and services used for content control profiles, including specific gameplay or coaching profiles. Databases 160 may store a variety of different content profiles associated with different content titles, different hardware (e.g., controllers), different abilities and skills, different gameplay status or styles, etc., that may be specific to a particular user, user group or team, user category, game title, game genre, etc. The content control profiles may be used to identify how users generally play at different points within a timeline of an interactive session associated with a digital content title, including different sets of control inputs (e.g., including combos corresponding to predetermined sets of control inputs having a specific sequence and timing) associated with an action within the virtual environment of the digital content title. The content control profile may be specific to a user, group of users, content title, content genre, gameplay style, or other parameter. One or more content control profiles may therefore be stored in the databases 160 for each user, user pairings or other user groups, user-content matches, or other combination of parameters. Content control profiles may include one or more intention maps that associate certain virtual (e.g., in-game) conditions with sets of control inputs that are typically used to take a virtual action in response to such conditions. Such intention maps may be developed and refined over time based on ongoing analysis of user gameplay data (e.g., as captured by UGC system described in further detail in relation to FIG. 2). By referring to content control profiles and associated intention maps, cooperative controls server 140 may therefore identify that incomplete or erroneous set of control inputs are nevertheless associated with a specific virtual action intended by the user in a current interactive session.

In exemplary implementations, cooperative controls server 140 may receive a request to support cooperative play of a specific digital content title. The request may specify or otherwise indicate a set of one or more source devices (e.g., user device 150), which may be associated with one or more users (e.g., designated player(s), designated coach(es) including artificial intelligence (AI)-based virtual coaches). In some implementations, the request may be received from a single user device that specifies a need to be matched with another user device. In response, cooperative controls server 140 may identify a suitable match to another user device that is available for cooperative gameplay. Such match identifications may be based on analysis of user status, abilities and disabilities, skills, experience level, associated hardware and hardware capabilities, historic gameplay data, gameplay style, and other parameters associated with the requesting user and the matched user identified as being complementary. In some embodiments, additional user input may be requested to identify a match. Such additional user input may be requested in the form of questionnaires, quizzes, skills assessments or demonstrations, or any combinations of the foregoing.

As such, a player who may not be able to successfully play a game or otherwise navigate a virtual environment by their own for any reason may still be provided with a successful and enjoyable user experience within the virtual environment based on the matching user(s) identified as complementary and available to participate in cooperative gameplay. In addition to improving accessibility for players of different experience, skills, and abilities, cooperative gameplay may also allow players who have different hardware (including hardware specially configured or modded for different abilities and disabilities) to fully participate in the latest content titles that may otherwise have rigid hardware requirements to perform certain virtual actions. Where no other suitable matching player is available or where specifically requested, cooperative controls server 140 may match the requesting user to a source device under control on an AI that may be specifically configured to be complementary to the requesting user (e.g., in accordance with content control profiles(s) and other user data).

In communication with one or more hosting content source servers 110, cooperative controls server 140 may generate at least one virtual avatar within a virtual environment of the requested content title and configure the virtual avatar for cooperative gameplay control by the source devices. Cooperative gameplay allows for the group of source devices to jointly and/or cooperatively provide control input in combination to simulate single-player control. As such, control input from the group of source devices may be combined to control a single avatar (or other virtual role or point-of-view typically controlled by a single player) within a virtual environment, as well as control a set of multiple virtual characters (e.g., armies, fleets, squadrons) in content titles that allow for single-player control over multiple virtual characters. Cooperative controls server 140 may combine the control inputs received from the designated set of source devices into a single set of control inputs, identify any title-specific control input sequences and timings from one or more applicable content profile profiles and apply the identified sequences and timings before using the resulting combined set of control inputs to perform one or more actions (e.g., via one or more virtual avatars) in the virtual environment. By referring to the applicable content control profile(s), cooperative controls server 140 may predict what virtual actions correspond to events during a certain scene (e.g., or tier or level) within a timeline of the interactive session. For example, the content control profile may specify that virtual fighting actions generally occur in response to a virtual monster or opponent appearing in the scene.

The cooperative controls server 140 may therefore analyze the combined control inputs received from the one or more source devices in such context to identify what virtual action may be intended to be performed. One source device may provide a set of control inputs that correspond to part of a combo, while another source device may provide another set of control inputs that correspond a remaining part of the combo. The cooperative controls server 140 may not only combine the sets of control inputs from the different source devices, but further combine specific control inputs in accordance with specific sequences and timing before providing the combined set of control inputs to control a virtual action in the interactive session (e.g., which may be hosted by one or more content source servers 110). In some implementations, the source devices may further specify how the control inputs may be prioritized, e.g., for certain scenes or types of virtual actions, whereby specific control responsibilities may be delegated between the source devices or controls may be handed off entirely between the source devices.

One type of cooperative gameplay may include coached gameplay, where one or more of the users (and associated source device(s)) is designated a coach. Different levels of coaching controls may be specified, whereby the coach may be able to exercise different levels of control over the virtual avatar during the session. For example, prioritization input may specify that input from non-coach source devices be prioritized in control of the virtual avatar unless and until certain triggers or triggering situations arise, such as certain combos or types of hardware inputs. As such, the coached player may play as much as possible on their own, while being able to rely on coach control input as a fallback in response to particularly difficult or otherwise designated conditions. As such, control inputs from a coach source device may be processed differently than control inputs from source devices that are not associated with a designated coach.

During coaching mode, cooperative controls server 140 may provide the designated coach or the coached player with previews or predictions of upcoming events, which also provides additional time to prepare to implement a certain virtual action. The designated coach source device may provide a set of control inputs associated with the predicted virtual action, which may be used to generate an audiovisual (e.g., onscreen, sounds, overlay, lighted buttons) and/or haptic (e.g., associated with specific buttons) notification to the coached player. The coaching notification may include automated or coach-provided hints or reminders as to what control inputs are needed to perform a virtual action or other information that may be helpful to the coached player. Such notification may be automatically triggered when the coached player is determined to be deviating from a set of control inputs typically required to perform a virtual action as indicated by the content control profile. For example, the coached player may be slow to remember how to complete a specific combo, thereby deviating from the typical timing indicated by the associated content control profile. The cooperative controls server 140 may detect the deviation in timing and automatically generate the coaching notification. In some instances, the timing of the interactive session may be modified whereby an event is paused, slowed down, or reversed to allow the coached player to try to enter the control inputs for the combo correctly. As such, the coached player may be given time to follow one or more prompts provided in coaching notifications before corrections or other coaching actions are taken. In some instances, the interactive session may be paused while the player is given a virtual refresher or training session and restarted when the player is ready to try again.

In some embodiments, one or more content control profiles may be part of or serve as training models for artificial intelligence (AI)-based virtual coaching. The AI-based coaching models may also be customized for a specific user based on their specific profile data, as well as expressed or discerned preferences. As discussed in relation to FIG. 2, data regarding the user gameplay under different conditions may be captured and used to generate metrics corresponding to the same. Such metrics may used by an AI-based virtual coach to adapt to the user, including adjusting when and how to implement different coaching actions (e.g., notification types and timing, difficulty adjustments, timing adjustments).

Figure 2:
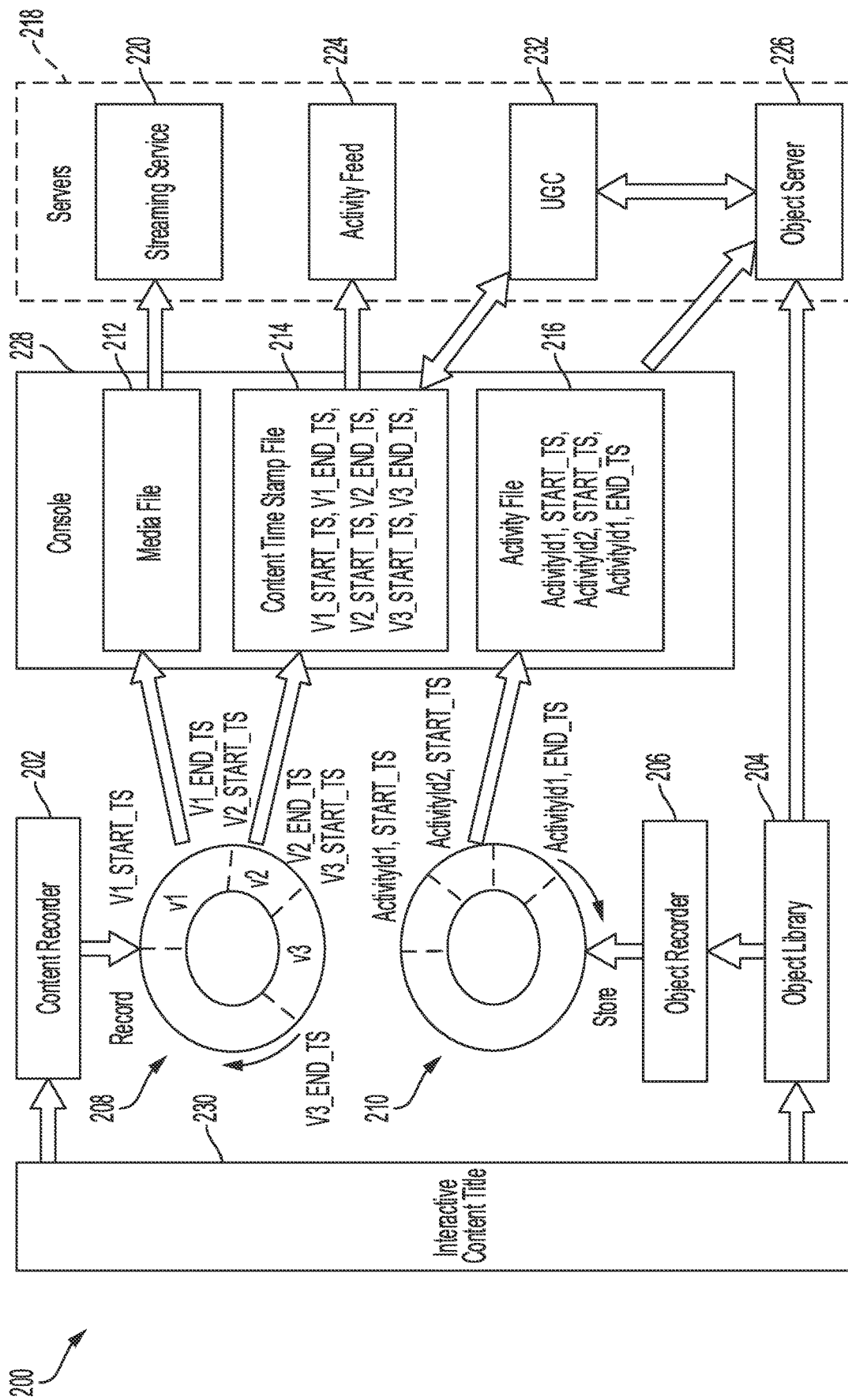
FIG. 2 illustrates an exemplary uniform data system (UDS) that may be used to provide data to a system for cooperative or coached gameplay in virtual environments.

FIG. 2 illustrates an exemplary uniform data system (UDS) that may be used to provide data to a system for cooperative or coached gameplay in virtual environments. Based on data provided by UDS 200, cooperative controls server 140 can be made aware of the current session conditions, e.g., digital content title, what virtual (e.g., in-game) objects, entities, activities, and events that users have engaged with, and thus support analysis of and coordination of cooperative control input by cooperative controls server 140 with current virtual interactive and/or in-game activities. Each user interaction within a virtual environment may be associated the metadata for the type of virtual interaction, location within the virtual environment, and point in time within a virtual world timeline, as well as other players, objects, entities, etc., involved. Thus, metadata can be tracked for any of the variety of user interactions that can occur in during a current interactive session, including associated virtual activities, entities, settings, outcomes, actions, effects, locations, and character stats. Such data may further be aggregated, applied to data models, and subject to analytics. Such a UDS data model may be used to assign contextual information to each portion of information in a unified way across digital content and/or game titles.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC.

As illustrated in FIG. 2, an exemplary console 228 (e.g., a user device 150) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 150. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 150.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 150.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 150. In another example, an object file 216 and a content time stamp file 214 may be associated by the console 228 during creation of each file 216, 214.

In exemplary embodiments, the media files 212 and activity files 216 may provide information to cooperative controls server 140 regarding current session conditions, which may also be used to assess a particular user (e.g., a user requesting cooperative gameplay), match the user to one or more complementary users or coaches, trigger different coaching actions, and make coaching adjustments (including refining AI-based coaching models for the specific user or similar users). Cooperative controls server 140 may therefore use such media files 212 and activity files 216 to identify specific conditions of the current interactive session, including performance by players, characters, and objects at specific locations and during specific events within the virtual environment.

Based on such files 212 and 216, for example, cooperative controls server 140 may identify a relevant content control profile associated with the current interactive session, which may be specific to one or more of content title, virtual environment, virtual scene or in-game event (e.g., significant battles with a big boss), gameplay style, etc., which may be used to identify what intent is associated with the incoming possible combinations of control inputs from multiple source devices. Such virtual environment or other conditions may drive how the incoming control inputs are grouped and combined together into sets having specific sequences or timing, thereby resulting in joint or shared control over virtual actions by a virtual character typically controlled by a single player.

As the incoming inputs are received, cooperative controls server 140 may identify parts of combos or moves that typically take place at the current virtual place and time where the virtual character is located or during the current event. The cooperative controls server 140 may select a set of the incoming inputs to combine into a single set of control inputs having a specific sequence and/or timing, which may correspond to an identified combo. Further, the cooperative controls server 140 may pick and choose different parts of the incoming control inputs to apply or not apply in accordance with prioritization settings specifying how and under what conditions conflicting or overlapping control inputs are to be applied.

Figure 3:
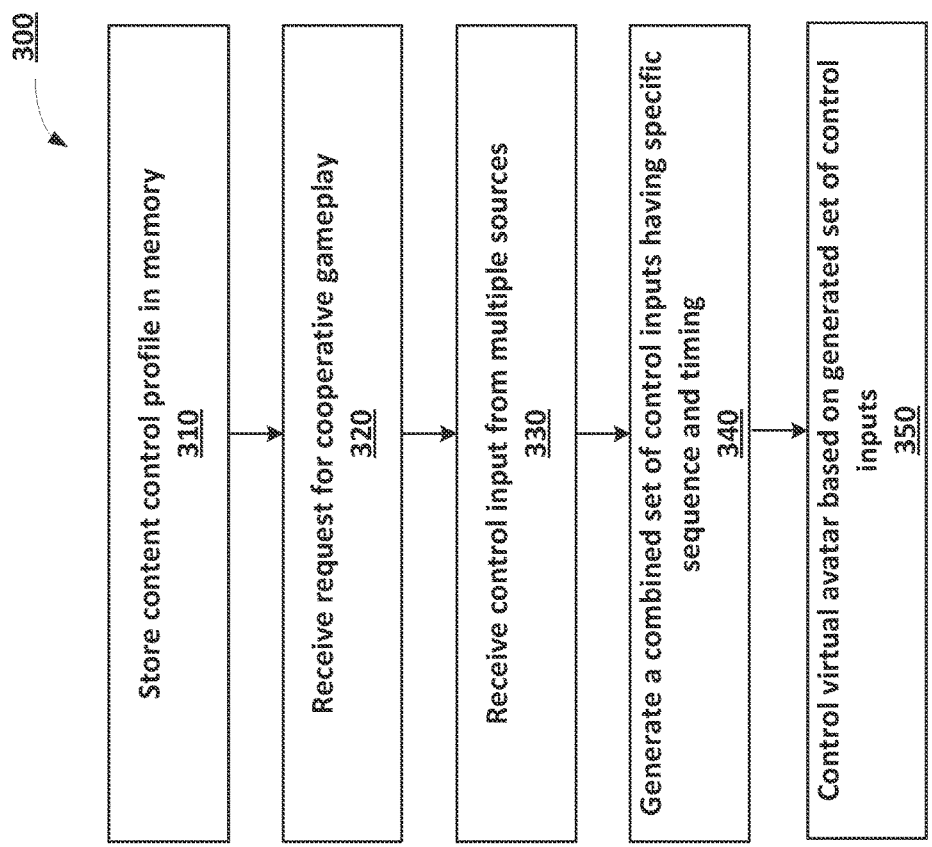
FIG. 3 is a flowchart illustrating an exemplary method for cooperative or coached gameplay in virtual environments.

FIG. 3 is a flowchart illustrating an exemplary method for cooperative or coached gameplay in virtual environments. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, content control profiles may be stored in memory (e.g., of databases 160). Each content control profile may identify a set of control input associated with a virtual action in a virtual environment of a digital content title. The content control profile may be further customized to a specific player based on historic data captured by UDS system 200 in files 212-216. Such a customized control profile may include player gameplay styles, specific hardware, historic or habitual moves or combos performed at certain points during an interactive session of the digital content title, specific hardware, and other related historical or habitual actions taken by the player and/or their associated avatar(s).

In step 320, a request may be received regarding cooperative gameplay of a specified digital content title, which may be associated with one of the content control profiles. The request may specify at least one user (associated with one source device) for cooperative gameplay. While the request may further specify another user for co-piloted or coached play depending on specified prioritization schemes, the request may also specify that the request user be matched to another source device (which may be associated with another user or which may be controlled by AI). In response to the request, cooperative controls server 140 may configure at least one avatar of the specified digital content title for joint or shared controls by the multiple source devices.

In step 330, control inputs may be received from the multiple source devices. Using the content control profile associated with the digital content title and examining current conditions, cooperative controls server 140 may analyze the combination of the incoming control inputs together to identify intended combos or moves or other virtual actions intended to be taken within the virtual environment. Cooperative controls server 140 may also apply certain prioritization schemes to favor or disfavor control inputs from one or more of the source devices, for example, to favor a coached player's gameplay style over that of a coach, or switch primary controls among the different control devices depending on the type of battle or challenge (e.g., shooting versus hand-to-hand combat).

In step 340, a combination set of control inputs may be generated based on the received incoming control inputs. Whereas the control inputs from the multiple different source devices may be out of sync due to having been entered by different users/AI and transmitted using different source devices over different communication networks, cooperative controls server 140 may nevertheless identify an intended sequence and timing by reference to content control profile as to historic or habitual moves or actions at the current point in time within a timeline of play during the interactive session. As such, cooperative controls server 140 may apply the identified sequence and timing to the combination set of control inputs before using the combination set of control inputs to control the virtual avatar designated for cooperative gameplay. The generation of the combination set of control inputs allows for simulation of what other players who are not engaging in cooperative gameplay may typically do to perform the virtual action in the virtual environment.

In step 350, the virtual avatar configured in step 320 may be controlled in accordance with the generated combination set of control inputs. Cooperative controls server 140 may provide the generated combination set of control inputs to a device hosting the interactive session, which may be any of the devices illustrated in FIG. 1. Where the request specified coached gameplay, additional coaching content or instructions may be also be provided or otherwise communicated to one or more of the source devices for presentation within the virtual environment of the interactive session. In some instances, a designated coach may initiate audiovisual or haptic notifications, implement a training-wheels mode to prevent deviation from an in-game path (e.g., fatal error, injury, and/or death), adjust a timeline to pause, slow down, rewind, or reverse virtual actions or events, and apply adaptable corrections that may be different under different conditions.

Figure 4:
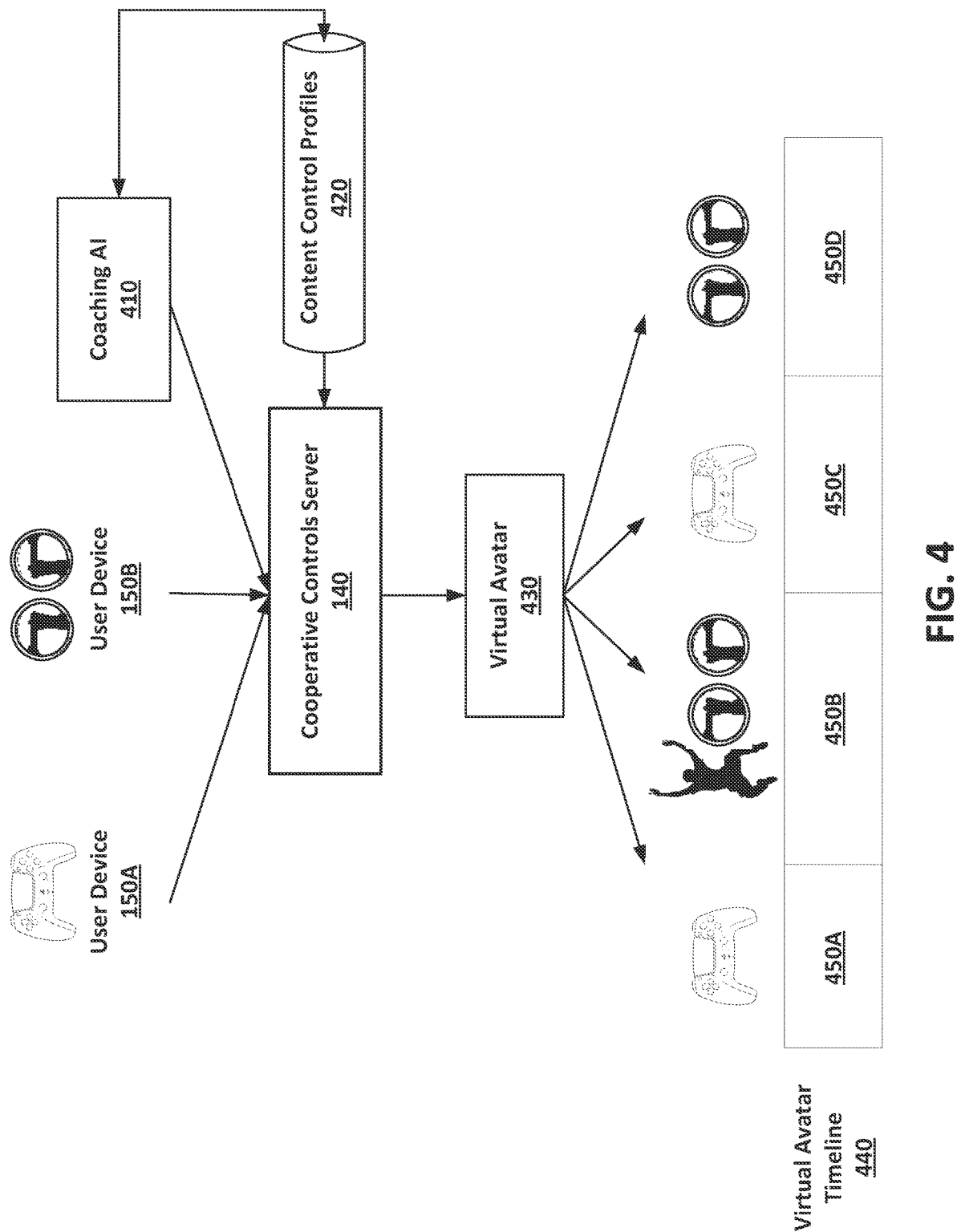
FIG. 4 is a diagram illustrating an exemplary implementation of cooperative or coached gameplay in virtual environments.

FIG. 4 is a diagram illustrating an exemplary implementation of cooperative or coached gameplay in virtual environments. As illustrated, different user devices 150A-C (e.g., corresponding to different controllers) may engage in cooperative gameplay, which further include a coaching AI 410. The coaching AI 410 and cooperative controls server 140 may both refer to one or more applicable content control profiles 420 to assess current status and conditions of the current interactive sessions and identify what moves or actions may be intended by the users of user devices 150A-B in such context.

As further illustrated, control input data may be provided from user devices 150A-B and a coaching AI 410 to cooperative controls server 140, which may interpret the same in accordance with the applicable content controls profile in order to generate a combination set of control inputs having a specific sequence and timing (e.g., simulating entry of control inputs by a single-player as to a specific move or combo). The generated combination set of control inputs may be provided to control virtual avatar 430 in different ways during a virtual avatar timeline 440 of the interactive session. As illustrated, virtual avatar timeline 440 may include a plurality of time periods 450A-D during which the different user devices 150A-B may exercise primary or prioritized control over the virtual avatar 430. For example, during time period 450A, cooperative controls server 140 may identify conditions associated with prioritization of control inputs from user device 150A in accordance with a prioritization scheme, while time period 450B may include conditions associated prioritizing gestural input (associated with either of the users of user devices 150A-B) and different controller input from user device 150B. Similarly, time period 450C may be associated with prioritization of control inputs from user device 150A, while time period 450D may be associated with prioritization of control inputs from user device 150B.

Control input from coaching AI 410 may be supplemental or provide a fallback option when neither user devices 150A-B nor their combination are able to complete an intended combo move or other virtual action in the virtual environment. Coaching AI 410 may also provide instructional and other related coaching content and notifications to assist the users of user devices 150A-B to provide the correct control inputs. The same or different coaching content may be provided to each of the user devices 150A-B depending on the respective needs of the users.

Figure 5:
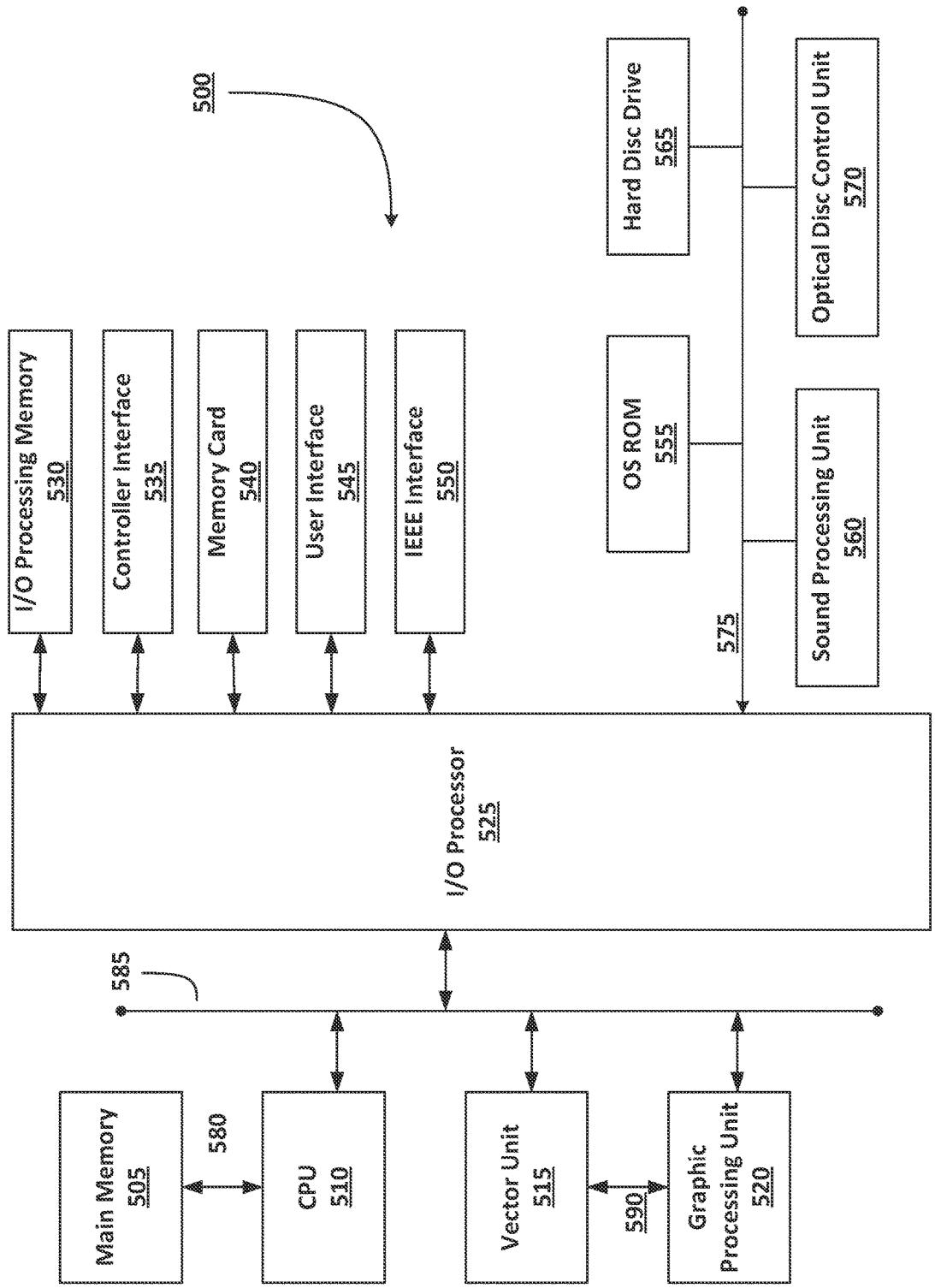
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for cooperative gameplay in virtual environments, the method comprising:
storing a content control profile in memory, wherein the content control profile identifies that entry of a specific set of control inputs is associated with performing a virtual action by one or more virtual avatars in a virtual environment of a digital content title;
generating at least one virtual avatar within the virtual environment, wherein the at least one virtual avatar is configured for cooperative gameplay control by a plurality of different source devices associated with a set of one or more different users;
receiving different sets of control inputs from each of the plurality of different source devices, wherein at least one of the different sets of control inputs entered by at least one of the different users into a respective one of the different source devices is prioritized, and wherein at least one of the sets of control inputs from another one of the source devices is designated as a coach associated with a specified level of control;
identifying that the at least one prioritized set of control inputs from the at least one user is associated with an intent to perform the virtual action including when the at least one prioritized set of control inputs corresponds to erroneous entry of the specific set of control inputs by referring to the content control profile, wherein the erroneous entry for the intended virtual action is identified based on the content control profile;
generating a combination set of control inputs that includes the different sets of control inputs using the at least one set of control inputs from the designated coach as a fallback in accordance with the specified level of control, wherein generating the combination set of control inputs includes applying a specific sequence and timing to the control inputs from the different sets when combined within the combination set in accordance with the content control profile; and
initiating performance of the virtual action by the at least one virtual avatar within the virtual environment in accordance with the different sets of control inputs combined within the combination set of control inputs.

2. The method of claim 1, wherein the combination set of control inputs correspond to at least one combo associated with the digital content title, the content control profile specifying that the at least one combo is associated with entry of the set of control inputs into a game controller in accordance with the sequence and timing.

3. The method of claim 1, further comprising receiving a request for cooperative gameplay designating one of the source devices as a coach, and further comprising generating a coaching notification within the virtual environment based on at least one of the sets of the control inputs that is received from the source device designated as the coach.

4. The method of claim 3, further comprising predicting that the at least one set of control inputs entered by the at least one user is about to deviate from the specific set of control inputs identified in the content control profile, wherein the coaching notification is generated based on the prediction.

5. The method of claim 3, wherein the designated source device includes an artificial intelligence (AI)-based virtual coach configured to be complementary to the at least one user, and wherein the set of the control inputs from the designated source device including the AI-based virtual coach is provided to supplement the at least one set of control inputs entered by the at least one user based on the content control profile.

6. The method of claim 1, further comprising customizing the content control profile for the at least one user, wherein customizing the content control profile is based on performance data associated with the at least one user during an interactive session of the digital content title.

7. The method of claim 1, wherein controlling the virtual action of the at least one virtual avatar includes preventing the at least one virtual avatar from deviating from the specific set of control inputs identified in the content control profile.

8. The method of claim 1, wherein controlling the virtual action of the at least one virtual avatar includes modifying a timeline of the virtual environment, and wherein the virtual action is performed within the modified timeline.

9. The method of claim 1, further comprising identifying one or more upcoming events within the virtual environment based on the content control profile, and generating a notification to one or more of the source devices, wherein the received different sets of control inputs are responsive to the notification.

10. The method of claim 1, wherein the different source devices include a plurality of different user devices corresponding to different hardware controllers.

11. The method of claim 1, wherein the at least one prioritized set of control inputs from the at least one user is prioritized until a triggering situation associated with the specific set of inputs for the intended virtual action is detected, and wherein the at least one set of control inputs from the designated coach is prioritized within the combination set of control input.

12. A system for cooperative gameplay in virtual environments, the system comprising:
  memory that stores a content control profile, wherein the content control profile identifies that entry of a specific set of control inputs is associated with performing a virtual action by one or more virtual avatars in a virtual environment of a digital content title;
  a communication interface that communicates with a plurality of different source devices over a communication network, wherein the plurality of different source devices is associated with a set of one or more different users; and
  a processor that executes instructions stored in memory, wherein the processor executes the instructions to:
    generate at least one virtual avatar, wherein the at least one virtual avatar is configured for cooperative gameplay control by the plurality of different source devices associated with the set of one or more different users, wherein the communication interface receives different sets of control inputs from each of the plurality of different source devices, wherein at least one of the different sets of control inputs entered by at least one of the different users into a respective one of the different source devices is prioritized, and wherein at least one of the sets of control inputs from another one of the source devices is designated as a coach associated with a specified level of control;
    identify that the at least one prioritized set of control inputs from the at least one user is associated with an intent to perform the virtual action including when the at least one prioritized set of control inputs corresponds to erroneous entry of the specific set of control inputs by referring to the content control profile, wherein the erroneous entry for the intended virtual action is identified based on the content control profile;
    generate a combination set of control inputs that includes the different sets of control inputs using the at least one set of control inputs from the designated coach as a fallback in accordance with the specified level of control, wherein generating the combination set of control inputs includes applying a specific sequence and timing to the control inputs from the different sets when combined within the combination set in accordance with the content control profile; and
    initiate performance of the virtual action by the at least one virtual avatar within the virtual environment in accordance with the different sets of control inputs combined within the combination set of control inputs.

13. The system of claim 12, wherein the combination set of control inputs correspond to at least one combo associated with the digital content title, the content control profile identifying that the at least one combo is associated with entry of the set of control inputs into a game controller in accordance with the specific sequence and timing.

14. The system of claim 12, wherein the communication interface further receives a request for cooperative gameplay designating one of the source devices as a coach, and wherein the processor executes further instructions to generate a coaching notification within the virtual environment based on at least one of the sets of the control inputs that is received from the source device designated as the coach.

15. The system of claim 14, wherein the processor executes further instructions to predict that the at least one set of control inputs entered by the at least one user is about to deviate from the specific set of control inputs identified in the content control profile, wherein the coaching notification is generated based on the prediction.

16. The system of claim 14, wherein the designated source device includes an artificial intelligence (AI)-based virtual coach configured to be complementary to the at least one user, and wherein the set of the control inputs from the designated source device including the AI-based virtual coach is provided to supplement the at least one set of control inputs entered by the at least one user based on the content control profile.

17. The system of claim 12, wherein the processor executes further instructions to customize the content control profile for the at least one user, wherein customizing the content control profile is based on performance data associated with the at least one user during an interactive session of the digital content title.

18. The system of claim 12, wherein the processor controls the virtual action of the at least one virtual avatar by preventing the at least one virtual avatar from deviating from the specific set of control inputs identified in the content control profile.

19. The system of claim 12, wherein the processor controls the virtual action of the at least one virtual avatar by modifying a timeline of the virtual environment, and wherein the virtual action is performed within the modified timeline.

20. The system of claim 12, wherein the processor executes further instructions to identify one or more upcoming events within the virtual environment based on the content control profile, and to generate a notification to one or more of the source devices, wherein the received different sets of control inputs are responsive to the notification.

21. The system of claim 12, wherein the different source devices include a plurality of different user devices corresponding to different hardware controllers.

22. A non-transitory computer-readable storage medium, having embodied thereon a program executable by a processor to perform a method for cooperative gameplay in virtual environments, the method comprising:
  storing a content control profile in memory, wherein the content control profile identifies that entry of a specific set of control inputs is associated with performing a virtual action by one or more virtual avatars in a virtual environment of a digital content title;

generating at least one virtual avatar, wherein the at least one virtual avatar is configured for cooperative gameplay control by a plurality of different source devices associated with a set of one or more different users;

receiving different sets of control inputs from each of the plurality of different source devices, wherein at least one of the different sets of control inputs was entered by at least one of the different users into a respective one of the different source devices is prioritized, and wherein at least one of the sets of control inputs from another one of the source devices is designated as a coach associated with a specified level of control;

identifying that the at least one prioritized set of control inputs from the at least one user is associated with an intent to perform the virtual action including when the at least one prioritized set of control inputs corresponds to erroneous entry of the specific set of control inputs by referring to the content control profile, wherein the erroneous entry for the intended virtual action is identified based on the content control profile;

generating a combination set of control inputs that includes the different sets of control inputs using the at least one set of control inputs from the designated coach as a fallback in accordance with the specified level of control, wherein generating the combination set of control inputs includes applying a specific sequence and timing to the control inputs from the different sets when combined within the combination set in accordance with the content control profile; and initiating performance of the virtual action by the at least one virtual avatar within the virtual environment in accordance with the different sets of control inputs combined within the combination set of control inputs.

* * * * *